United States Patent [19]

Brownell, Jr. et al.

[11] Patent Number: 4,531,120
[45] Date of Patent: Jul. 23, 1985

[54] SUPERPOSING GRAPHIC PATTERNS

[75] Inventors: Kendrick C. Brownell, Jr.; Thomas W. Scrutchin, Jr., both of Tucson, Ariz.

[73] Assignee: International Business Machines Corporation, Armonk, N.Y.

[21] Appl. No.: 459,430

[22] Filed: Jan. 20, 1983

[51] Int. Cl.$^3$ .............................................. G09G 1/16
[52] U.S. Cl. ................................... 340/723; 340/724; 340/745; 340/731; 340/735
[58] Field of Search ............... 340/735, 723, 731, 747, 340/745, 721, 709, 724

[56] References Cited

U.S. PATENT DOCUMENTS

| | | | |
|---|---|---|---|
| 4,242,678 | 12/1980 | Somerville | 340/731 |
| 4,254,409 | 3/1981 | Busby | 340/731 |
| 4,443,794 | 4/1984 | Sakurai | 340/735 |

Primary Examiner—Marshall M. Curtis
Attorney, Agent, or Firm—H. F. Somermeyer

[57] ABSTRACT

A machine-implemented method and computerized system for superposing one graphic pattern on another graphic pattern wherein the graphics are represented and generated electrically by rectangular arrays of digital signals corresponding to dot raster patterns to be printed or displayed. One graphic is a superior, or dominant, graphic while a second graphic is an inferior, or recessive, graphic. A computer is programmed to process the digital signals for producing dominant graphic contoured intermediate arrays for masking the array of the inferior graphic to produce a partial or fragmented array. The partial array is DOT ORed with the dominant graphic array to produce a pattern of superposed graphics separated by a background space contoured to the dominant graphic pattern.

7 Claims, 10 Drawing Figures

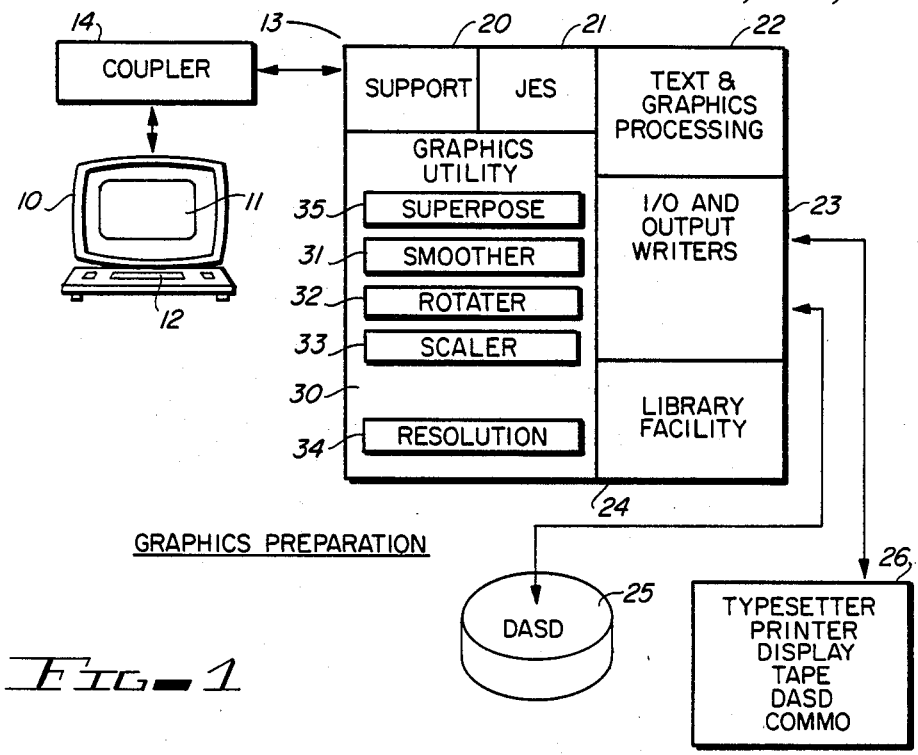
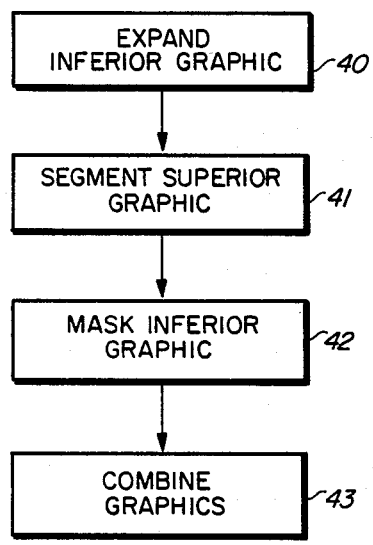
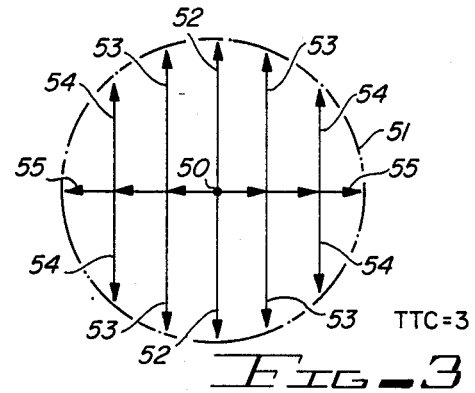
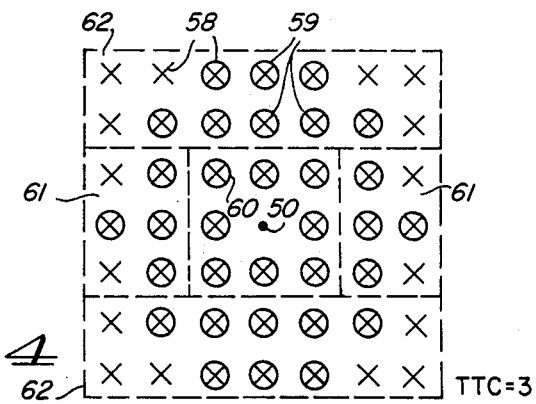

SUPERPOSING GRAPHIC PATTERNS

FIELD OF THE INVENTION

The present invention relates to superposing graphic patterns, each of which is represented by a rectangular array of print elements (pels or dots), for use in presenting documents on a cathode ray tube display, printing device or other image or document presentation apparatus.

BACKGROUND OF THE INVENTION

Superposing graphics, such as an underscore with an alphabetic or numeric character pattern, has been achieved by so-called overstriking. Overstriking is printing or displaying two character graphic symbols in one character graphic space. For example, a lower case "g" pattern can be underscored by overstriking with a horizontal line underneath the descender portion, through the descender portion or by breaking the horizontal line only at the outward facing boundaries of the "g" descender. For typographic quality, it is desired that the underscore be broken at all inward and outward facing boundaries of the descender portion with the break being contoured to the descender portion and separated therefrom in accordance with the weight of the "g" character. While ligatures can be constructed to reach the typographic quality desired, computerized printers and displays, such as cathode ray tube displays, electrophotographic printers and the like, employing rectangular arrays of dot patterns have required manually creating raster patterns for implementing the underscore to be overlaid or superposed over the character graphic. As the terms are used herein for underscore purposes, the character graphic is a dominant or superior graphic while the underscore is a recessive or inferior graphic to be interrupted in a manner contoured to, but spaced from, the superior or dominant graphic by an arbitrarily selected distance. In accordance with the present invention, such graphic superposition is fully automatic, such as can be employed in a programmed digital computer.

Superposition of graphics also has been achieved by creating an occlusion signal in video circuits whereby the inferior image is blanked from the video picture while the image being superposed is placed in the occluded area. U.S. Pat. No. 3,961,133 shows such an occlusion signal wherein each line of the raster pattern has an occlusion signal measured in the time domain to make room for the image being superposed on a larger image on the video screen. Such a system does not provide for arbitrary and selective spacings between the images which are contoured to one of the images. Generation of character graphics, including overlapping, is shown in U.S. Pat. No. 3,984,828. This patent uses a bar or rectangular array approach to create a plurality of numerics, none of which allow contouring with selective spacing between superposed graphics.

Similarly, U.S. Pat. No. 4,317,114 shows superposing one graphic on another using an inhibit or NOT function wherein one image is superposed on the other by blanking out the other image, i.e., similar to the first-mentioned U.S. Pat. No. 3,961,133. Examination of this reference showed no selective spacing of one graphic from another for achieving the typographic quality superposed graphic, as mentioned above. Accordingly, there is needed an automatic means of superposing graphic patterns generators which facilitates the generation of typographic quality superposed graphics of all types, particularly for underscoring, no limitation thereto intended.

DESCRIPTION OF THE INVENTION

In accordance with the invention, a superior (dominant) and inferior (recessive) graphic are selected to be superposed one on the other with both graphics being respectively represented and generated by rectangular arrays of binary signals, one binary signal representing the graphic (foreground pels) while the other binary signal representing background (background pels). An array of digital signals is generated from the dominant graphic array by adding foreground pel indicating digital signals to the dominant graphic array in accordance with the desired graphic separation. The generated array is preferably enlarged by a separation dimension equal to an integral number of dots or pels in a circular array around each foreground pel in the dominant graphic pattern. The generated array then masks the inferior graphic array to create an occluded or fragmented array. The fragmented array is then logically ORed with the dominant array to create a superposed graphic pattern which is a combination of the two original graphic patterns and having a predetermined separation dimension therebetween, contoured to the dominant graphic pattern. The resultant array is usable to generate a typographic quality superposed graphic.

For superposition efficiency, only a portion of the dominant graphic pattern need be used in the superposing processing. The inferior graphic pattern is measured, then a portion of the dominant graphic pattern equal to the size of the inferior graphic pattern plus the separation dimension is selected for creating the intermediate raster patterns with a final ORing step, which includes the entire dominant graphic pattern. Other variations on selecting array sizes are practiced within the present invention for obtaining a diversity of graphic superposition results.

The foregoing and other objects, features, and advantages of the invention will be apparent from the following more particular description of the preferred embodiments of the invention, as illustrated in the accompanying drawings.

DESCRIPTION OF THE DRAWINGS

FIG. 1 is a block diagram of a graphics preparation system employing the present invention.

FIG. 2 is a simplified flowchart of machine operations performed in the graphics preparation system of FIG. 1 used in explaining the operation of the system in practicing the present invention.

FIG. 3 is a diagrammatic showing of expanding a dominant graphic pel or dot for practicing the invention in the FIG. 1 illustrated system.

FIG. 4 illustrates a rectangular array expansion from each pel of a dominant graphic for practicing the invention in the FIG. 1 illustrated system.

DETAILED DESCRIPTION OF THE DRAWINGS

Figure 5:
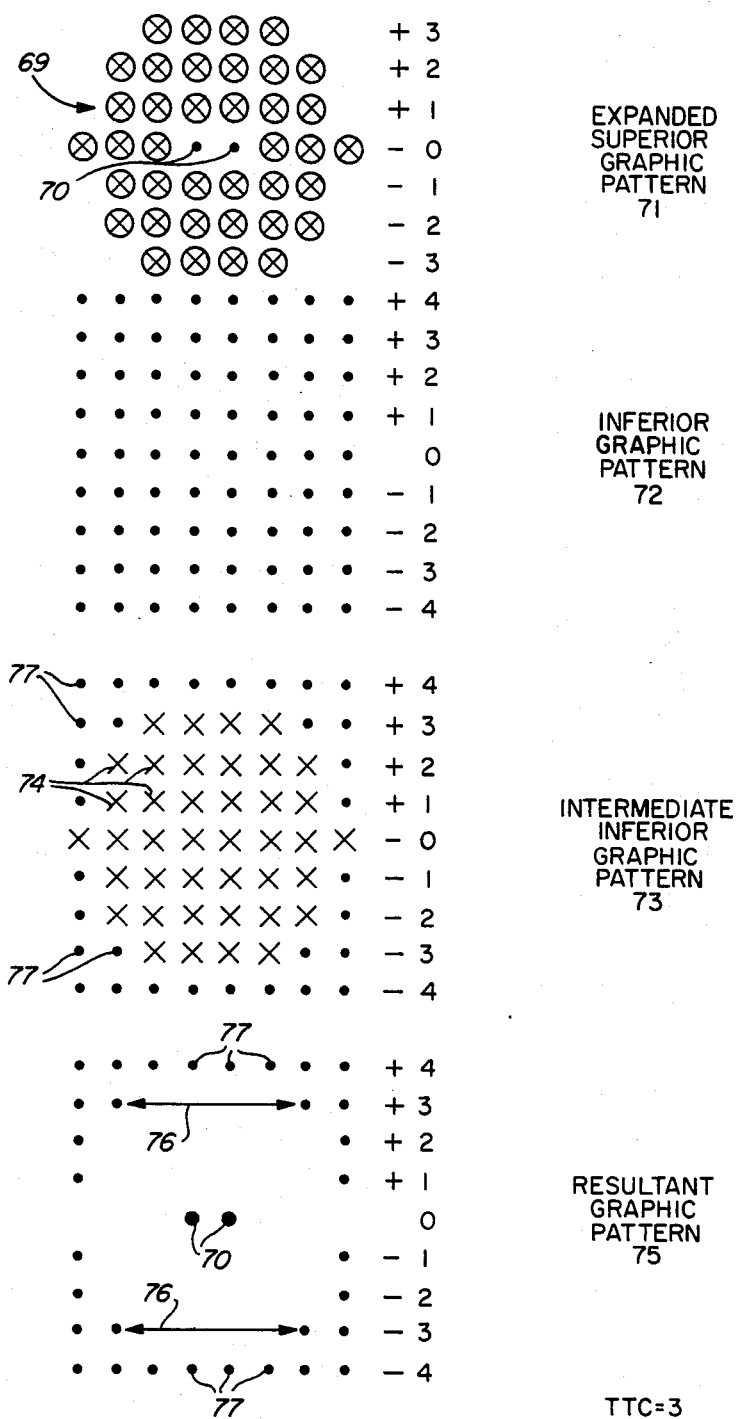
FIG. 5 shows a sequence of dot or pel patterns resulting from a series of machine steps of the FIG. 1 illustrated system during a superposition of a two-pel array on a larger inferior graphic raster pattern.

Referring now more particularly to the drawings, like numerals indicate like parts and structural features in the various diagrams. FIG. 1 shows an interactive terminal 10 having a usual CRT display screen 11 and an input keyboard 12 coupled to a programmed digital computer 13 via a suitable coupler 14. Digital computer 13 is shown in a logical form for illustrating how various programs in the digital computer 13 interact with the terminal 10 for implementing the present invention. It is to be understood that the electronic circuits of the digital computer 13 are those circuits usually employed in constructing a programmable digital computer of a general purpose type.

Within the computer 13 is a support program 20 which operates interactive terminal 10. Support program 20 receives data input from the terminal 10 for use in the superposition of graphic generator pattern arrays in accordance with the present invention. It is preferred that digital computer 13 be of the multiprogram type such that job entry system (JES) 21 can selectively schedule operations of interactive terminal 10 with other text and graphics or other programs residing within digital computer 13. For example, text and graphics processing program 22 can be intimately related with the operation of terminal 10 or can process text and graphics of all types from diverse sources. Text and graphics processing program 22 includes document formatting which may call out graphic characters such as those generated in accordance with the present invention. I/O and output writers 23 is a program that couples the text and graphics processing program 22 to store the document in an electronic form on DASD (direct access storage device or disk file) 25 as well as supplying the document in electronic form to an output document presentation device 26. Device 26 can be a typesetter, printer of any type, electronic display such as display 11 for terminal 10, magnetic tape, another DASD or a communication link (COMMO). Library facility 24 is a program that accesses electronic fonts (sets of binary signals representing character graphic generator patterns) stored in DASD 25 for use by text and graphics processing program 22. To support all of the above interactive text processing, a graphic facility program 30 enables the creation and insertion of such electronic fonts (font generation patterns) into DASD 25 using JES 21 for scheduling I/O and output writer program 23. The electronic fonts usually consist of raster arrays of binary digital signals corresponding to the graphics to be presented by device 26. Within the graphic utility 30 are several programs, such as a graphics smoother 31 which rounds the corners of graphics being created and rotator 32 which rotates the raster pattern such that the graphic can be presented in any orientation by the document presentation device 26. Scaler 33 adjusts the point size (vertical height), pitch and width of a character graphic or other graphic to be presented. Resolution program 34 adjusts the resolution of the graphic pattern to the device 26 resolution; for example, an electronic font consisting of a plurality of character graphic patterns can have its resolution changed from 360 pels per inch to 240 pels per inch or to 600 pels per inch, all under control of the graphic utility.

The present invention is embodied in the graphic generator utility 30 by the superpose program, or module 35, which operates in accordance with the machine operations chart shown in FIG. 2. The graphic utility has the ability to fetch graphic patterns from DASD 25 and supply them to the superpose program 35, and then to store a new graphic generating pattern created by the superpose program 35 in DASD 25 such that the text and graphic processing program 22 can identify such new graphic pattern for use by device 26. In this manner, the graphic utility automatically creates graphic generation patterns based upon previously created graphic patterns for facilitating document presentation with a wide variety of character and other graphic forms.

The FIG. 2 illustrated superposition machine operations chart shows step 40 as first expanding the inferior graphic pattern. This step effectively adds background pel signals to the original inferior graphic pattern. The expanded inferior graphic pattern is used in step 41 to identify the segment of the superior or dominant graphic pattern to be used in creating a partial superposed graphic segmentation of the superior graphic pattern. This segmentation reduces the computer processing power required for superposition, i.e., those portions of the graphic patterns that are not affected by the superposition are not processed. At step 42, the segmented superior graphic pattern is manipulated in accordance with the invention to create a mask or occlusion array in accordance with the segmented superior graphic plus a desired physical graphics separation between the superior and inferior graphics in the graphic pattern being created. The mask is then logically NOT ANDed with the inferior graphic pattern for creating a fragmented graphic array, which is then combined with the superior graphic in step 43. The term "NOT AND" means that foreground pel indicating signals residing in the same array position as occlusion pel indicating signals are switched to be background pel indicating signals, which leaves only foreground pel indicating signals of the inferior graphic pattern that coincide with background pel indicating signals of the occlusion pattern. The graphics combining function of step 43 can be two steps. First, the segmented inferior graphic is combined with the segment of the superior graphic used in the processing. The resultant graphic then is inserted into the array of the original superior graphic. It should be remembered that the original graphic patterns are still stored in DASD 25; the newly created graphic pattern is stored in DASD 25 in a data storage space specially allocated therefor using usual data storage allocation procedures.

The steps of FIG. 2 are preferably implemented in the superpose graphic program 35 using an APL language such as described in publication GC26-3847, published by International Business Machines Corporation, Armonk, N.Y. as file number S370-22 (July, 1978) and entitled "APL Language". APL has a capability for handling arrays in an efficient manner. Accordingly, it is a preferred language for implementing the invention.

FIG. 3 illustrates a process of creating an occlusion pel pattern mask for a single dominant foreground pel 50; it is to be understood that, in an array of pels for generating a character graphic, each of the foreground pels in the graphic will have a similar circle 51 of occlusion wherein no foreground pel of an inferior or recessive graphic is permitted to occur. FIG. 3 illustrates an expanded occlusion array for separation between a dominant and recessive graphic of three pels (TTC=3). The general procedure is to generate occlusion foreground pels vertically, then horizontally, for enlarging the array of foreground pels around the single dominant pel 50, such that all pel positions within a circle having radius TTC will contain occlusion pels. The array of digital signals represents a pel array having pels in predetermined pel positions with a constant spacing. First, as represented by arrows 52, three occlusion pels above and below the single dominant pel 50 are added along the vertical ordinate. Then, the process generates the occlusion pels in the left semicircular portion of circle 51. The left double-headed arrow 53 represents the addition of seven occlusion pels to the expanded pel array. One of the pels is on the horizontal ordinate of pel 50, three occlusion pels are above the ordinate and two pels below the ordinate. The next step is to add five occlusion pels as indicated by the left arrow 54; one occlusion pel on the horizontal ordinate and two occlusion pels above and below the ordinate. Finally, at position 55 one occlusion pel is added at the horizontal ordinate along the circle 51. The right semicircular portion of circle 51 is generated in a similar manner.

Since it is desired to automatically process all graphics as a rectangular array of pels as opposed to a circular array, the rectangular array of FIG. 4 is the electrical representation of the occlusion array of FIG. 3. The single foreground dominant pel 50 remains in the center of the rectangular array. The Xs represent background pels (binary zeroes) while the encircled Xs 59 represent the occlusion or masking pels added around single pel 50 for creating a spacing between the dominant and recessive graphic patterns.

FIG. 5 is a simplified showing of using the principles set forth in FIGS. 3 and 4 for superposing an inferior graphic pattern 72 on a superior graphic pattern 70 consisting of two foreground pels along one line. For simplicity, background pels are not shown. Circled "Xs" 69 around the two pels 70 correspond to circle 51 of FIG. 3. The circled Xs 69 have an effective radius of TTC=3 around pels 70. Numeral 71 denotes TTC expanded (with rounding of the pel inclusion calculations to include pels on the circular periphery, i.e., make the intergraphic spacing constant for a given spacing value) superior graphic for creating an occlusion or mask pattern as illustrated. The pattern includes the two foreground pels 70 in the center of the array, surrounded by a plurality of occlusion pels 69 represented by the encircled Xs. The numerals on the right-hand side of the arrays indicate the displacements of the rows from the foreground pel 70 baseline represented by the numeral 0. The inferior graphic 72 is shown as a portion of a horizontal line having a thickness of nine pels. The occlusion pattern 71 is logically NOT ANDed with the inferior graphic pattern 72 to produce the intermediate inferior graphic pattern 73, resulting in deleting foreground inferior pels 74 (represented by the Xs in this portion of the FIG.) from the inferior graphic pattern and leaving inferior foreground pels shown as dots 77 in the rows +2, +3, +4, −2, −3, −4 of the inferior graphic pattern. Once the masking is completed, the intermediate inferior and the superior graphic patterns are combined in a logical OR fashion to create a new or resultant graphic pattern 75, which includes the original foreground dominant pels 70 bracketed by the remaining inferior graphic foreground pels 77. The background pels are not shown for purposes of clarity. New graphic pattern 75 has the inferior graphic 72 separated from the superior graphic 70 by the distance of three pel positions in all directions. The separation is contoured to the shape of the foreground pels 70, that is, the area represented by double-headed arrow 76 includes pels deleted in order to achieve the desired pel spacing between the graphics being superposed. Such contouring will become more apparent from FIGS. 6 and 7.

Figure 6:
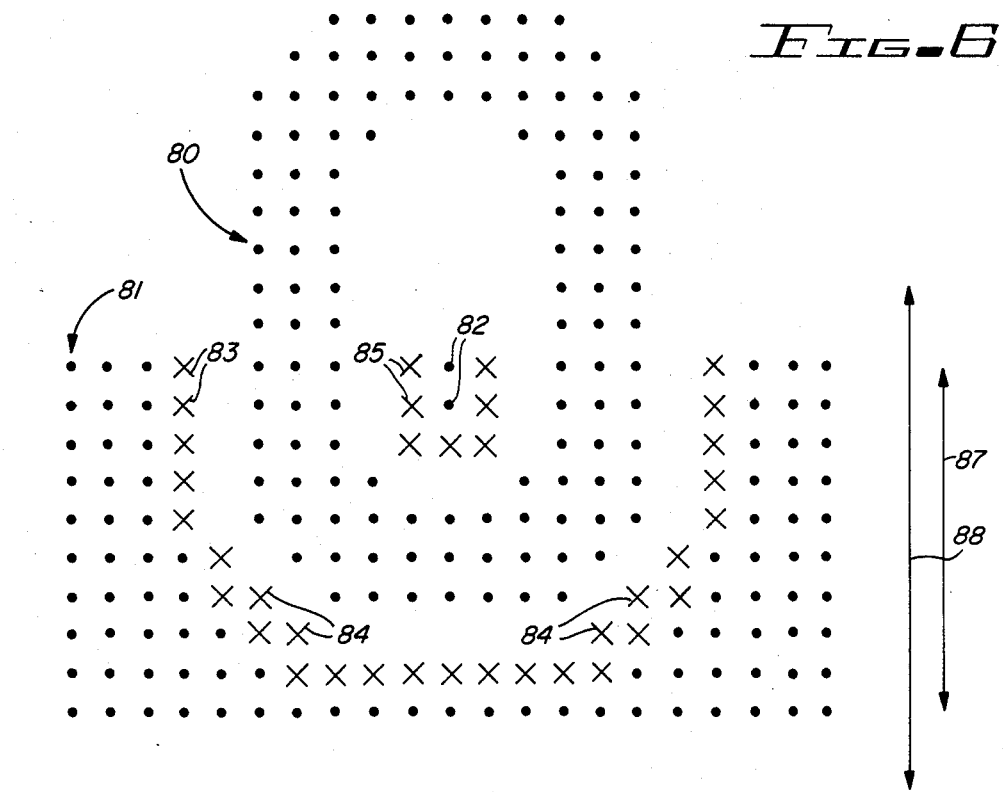
FIGS. 6 and 7 illustrate superposition of two different inferior graphics on a single dominant graphic as superposed by the FIG. 1 illustrated system.
Figure 7:
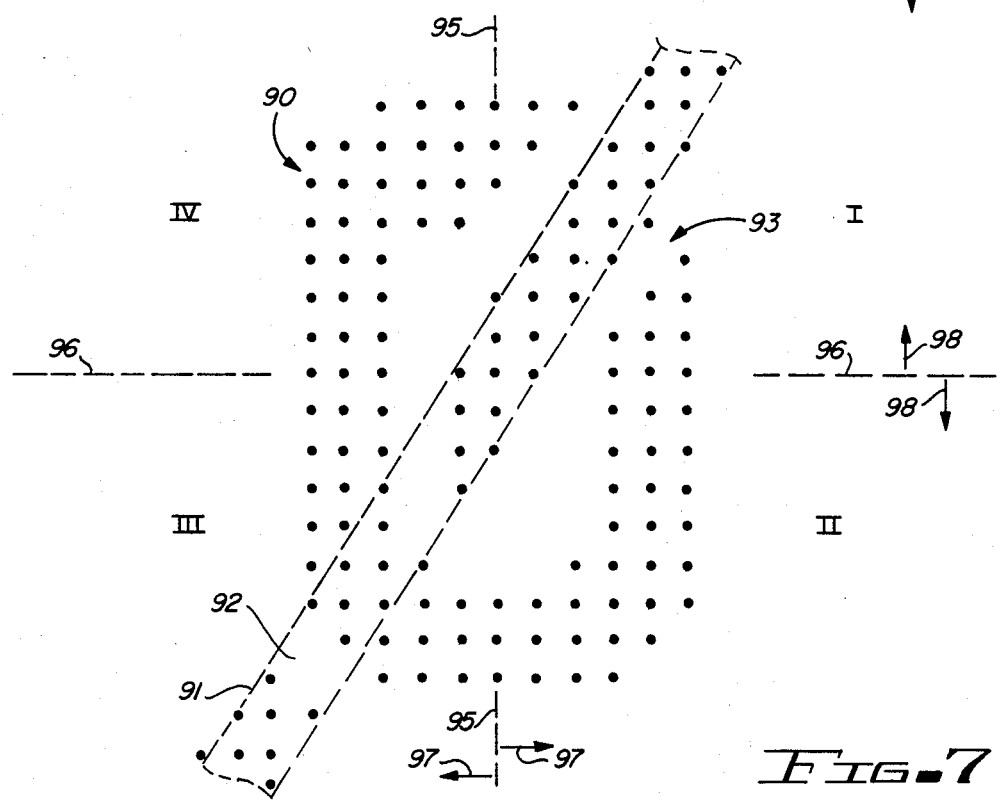

FIGS. 6 and 7 show the letter "O" first being underlined in FIG. 6 and then having a slash extending therethrough in FIG. 7. In FIG. 6 the solid dots represent foreground pels-background pels are omitted for clarity. A first set of pels 80 represents the letter "O", while pels 81 represent an underline or inferior graphic which is to be superposed on the superior graphic 80. The solid dot pels show a separation of two pels between the superior and inferior graphic patterns. The two pels 82 inside the graphic pattern 80 are a portion of the underlining 81. For completing contouring of the underscore, or inferior graphic, to the superior graphic zero, the inclusion of pels 82 within the superior graphic for achieving typographic quality of superposed graphics is provided by the present invention. To further illustrate the effect of changing the spacing between the superior and inferior graphic patterns, the pels 83 and 85 are represented by Xs for showing a separation of the superior and inferior graphic of a single pel position. In addition to leaving an additional line of pels of the inferior graphic pattern 81 facing and contoured to the superior graphic pattern 80, additional pels 84 at the lower curves of the superior graphic pattern 80 are added to more fully maintain the separation between the superior and inferior graphics constant for achieving typographic quality. Such additional pels 84 occur because of the described circular masking for each of the *individual* foreground pels of the superior graphic 80 as shown by the addition of the occlusion pels in the superior graphic 80, as explained with respect to FIG. 3. Additionally, inside the superior graphic pattern 80 the foreground inferior pels 85 are added for the reduced spacing between the superior and inferior graphics, which results in maintaining typographical quality contouring of the interrupted inferior graphic 81 to the superior graphic 80. It is to be appreciated that the number of pels in a character graphic to be printed will have a much higher density than that shown in FIG. 6, thereby the edges of the graphics 80 and 81 will have a much finer and acceptable typographic quality because of such higher resolution.

When inferior graphic 81 is to be superposed with respect to superior graphic 80, it is not necessary to process the entire superior graphic 80. Accordingly, prior to the steps shown in FIG. 5, the inferior graphic 81 is measured as to its vertical extent as indicated by double-headed arrow 87. Assuming a desired spacing between the graphics of two pels, then it should be apparent the pels of the superior graphic 80 that effect deletion of pels of the inferior graphic 81 are those pels spaced from the inferior graphic by the desired spacing. Accordingly, as represented by double-headed arrow 88, that portion of the superior graphic 80 lying within the vertical extent defined by double-headed arrow 88 (the vertical size of the inferior graphic plus the desired separation on both vertical boundaries of the inferior graphic) is used in the masking operation shown in FIG. 5. Upon completion of the new graphic as shown at 75 of FIG. 5, that portion of the superior graphic 80 plus the inferior graphic 81 are reinserted into the total rectangular array of the superior graphic 80 for completing a new graphic. Segmentation of the superior graphic based upon the extent of the inferior graphic for generating a new graphic reduces processing time and data storage requirements.

FIG. 7 illustrates (no background pels shown) a slash line 91 being superposed upon a "O" graphic 90, wherein at lower left-hand corner the "O" graphic 90 is the superior graphic while in the upper right-hand corner the slash line 91 is the superior graphic. Accordingly, the resultant new graphic finds the slash line 91 being interrupted by the "O" graphic 90 and spaced therefrom at pel positions 92 by a single background pel (not shown). In a similar manner, in the upper right-hand corner, the "O" graphic 90 is interrupted and separated from the slash line graphic 91 by a single pel space 93. The spaces 92 are contoured to the graphic 90 while the spaces 93 are contoured to the graphic 91.

The array expansion follows the teaching of FIGS. 3 through 5, the graphics are divided into four quadrants indicated by coordinate lines 95, 96; each quadrant of pels is handled independently. The background pels are omitted for purposes of clarity. Quadrant I, the upper right-hand quadrant, (includes spaces 93), is expanded by one pel position on all four corners of the quadrant subarray. That is, the inferior graphic 90 (for that quadrant) is expanded and includes the pels of the quadrant I inferior graphic 90 from the other three quadrants II, III and IV. The subsequent processing for the first quadrant follows the previously described procedure. For Quadrant II, the lower right-hand quadrant, graphic 90 is the superior graphic with the expansion of the graphic 91 as an inferior graphic following the previously described procedures. Similarly for Quadrant III, the graphic 90 is the superior graphic while graphic 91 is the inferior graphic. For Quadrant IV, the quadrant 90 is again the superior graphic. Accordingly, using the segmentation described for FIG. 6, applying it to plural portions of the graphic pattern, any number of segments of the pattern can become a superior graphic or an inferior graphic with each segment being expanded as if it were a separate graphic pattern. Recombination of the segments into a single graphic pattern is merely by logically ORing the individually processed segments.

Figure 8:
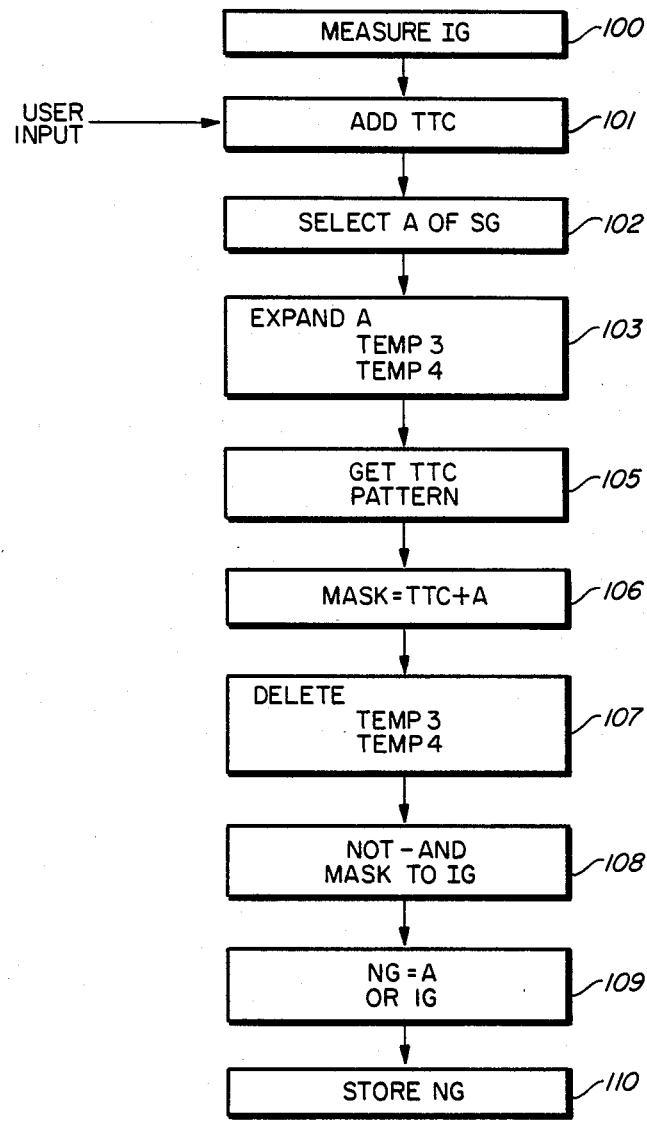
FIG. 8 is a chart of machine operations for the FIG. 1 illustrated system for practicing the present invention.

FIG. 8 illustrates a generalized flowchart for the computerized or machine generation of a superposed graphic having contoured separation. At 100, the inferior graphic IG is measured, such as shown in FIGS. 6 and 7. At 101, the measured inferior graphic is expanded by a user-inputted desired spacing in pel positions between the superior and inferior superposed graphics, the spacing herein abbreviated as TTC. At 102, that portion of the superior graphic SG, hereinafter referred to as segment "A", having a dimension equal to the dimension of the expanded inferior graphic is selected. At 103, the segment A of the superior graphic expands as shown in FIG. 4 with the expansion arrays being stored in computer registers (in main memory and not shown), referred to as TEMP3 and TEMP4. TEMP3 and TEMP4 have been set to zero such that all the pels represented by these binary signal arrays are background pels. At 105, the segment A portion of the superior graphic is expanded as shown in FIGS. 3 and 4 and converted into a mask at 106 by adding the occlusion pels, such as pels 59 of FIG. 4, to the pels already existing in the segment A of the superior graphic. At 107, the portions of the array represented by the contents of TEMP3 and TEMP4 are deleted. It should be noted that many of the foreground superior pels will be superposed over pels of the superior graphic as well on occlusion pels of adjacent superior graphic pels 50, all as shown in FIG. 5. At 108, the resultant occlusion mask is NOT ANDed with the inferior graphic to delete those portions of the inferior graphic which coincide with the original foreground pels of the superior graphic and the occlusion pels added for generating the contoured separation space. Then at 109, the new graphic NG is generated by logically OR combining the A segment of the superior graphic with the inferior graphic fragmented pattern generated at 108. Then the new graphic is stored at 110 with the remainder of the superior graphic to provide a composite graphic resulting from two original graphics. Original graphics can be preserved in their own respective data storage spaces while the new graphic is assigned to and stored in a new area of DASD 25.

Figure 9:
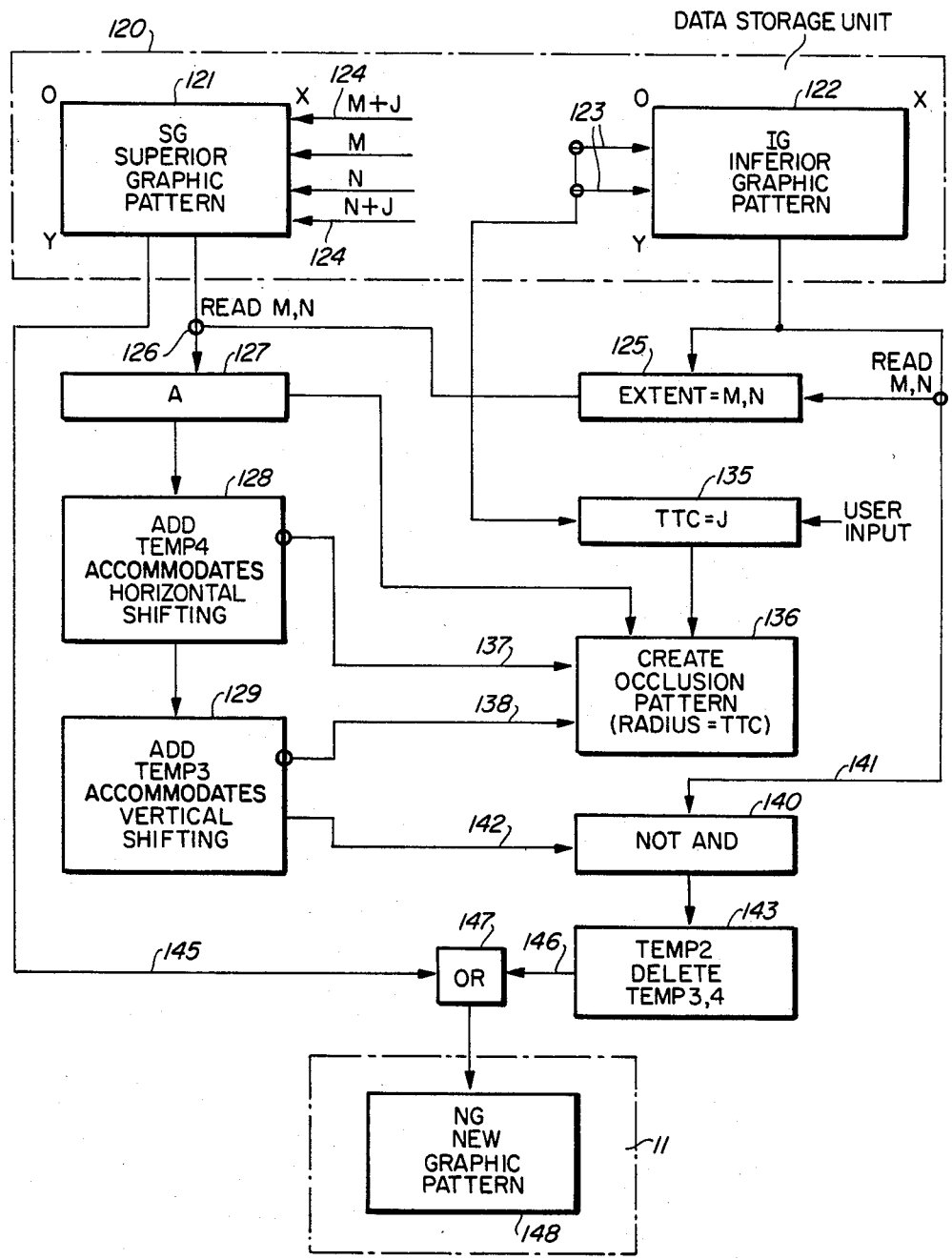
FIG. 9 is a diagrammatic showing of machine operations for implementing the FIG. 8 illustrated flowchart.

FIG. 9 shows processing elements used to effect the machine-implemented process of FIG. 8. A data storage unit 120 stores a superior graphic raster pattern at 121 and an inferior graphic raster pattern at 122. Both of the raster patterns have the same relative address space identified as an array of pels (binary ones and zeroes) having a reference point 0 at the upper left-hand corner of the respective patterns. The horizontal ordinate extends to location X while the vertical ordinate extends downwardly to location Y. The inferior graphic pattern (foreground pels) is measured, and the desired separation J (on integral numbers of pel positions) inputted by the user at 135 is added to the measured inferior graphic pattern stored at 122, resulting in upper and lower boundaries M and N along the vertical ordinate 0-Y of array 122. M and N correspond to double-headed arrow 88 of FIG. 6. The graphic pattern extent to be processed by each of the arrays 121 and 122 is defined at 125 as being MN for the vertical ordinate with the horizontal ordinate extending from 0 to X. The portion M to N plus "j" borders (shown as M+j and N+j) of superior pattern array 121 is read at 126 into array registers A 127. Registers 127 now contain that segment of the superior graphic pattern used in the superposing machine processing. At 128 and 129 TEMP4 and TEMP3 are added for accommodating the array processing steps of vertical and horizontal shifts. Element 136 is the control which responds to the user-inputted space J for defining the main memory data storage areas 128 and 129. The resultant occlusion array (viz array 71 of FIG. 5) moves over line 142 to NOT AND segment 140, which also receives the inferior graphic pattern between extents M and N from the array 122 for NOT ANDing the two patterns together. NOT AND 140 deletes those foreground pels of the inferior graphic patterns which coincide with the occlusion pels of the expanded A array (as shown in FIG. 4). At TEMP2 (a portion of the main memory 120) the fragmented array corresponding to element 73 of FIG. 5 is stored. That array is combined logically at 147 with the superior graphic array 121 to create the new graphic pattern NG which is presented on the display 11 as pattern 148. Alternately, the new graphic pattern can be stored within data storage unit or main memory 120 for relaying to DASD 25.

Figure 10:
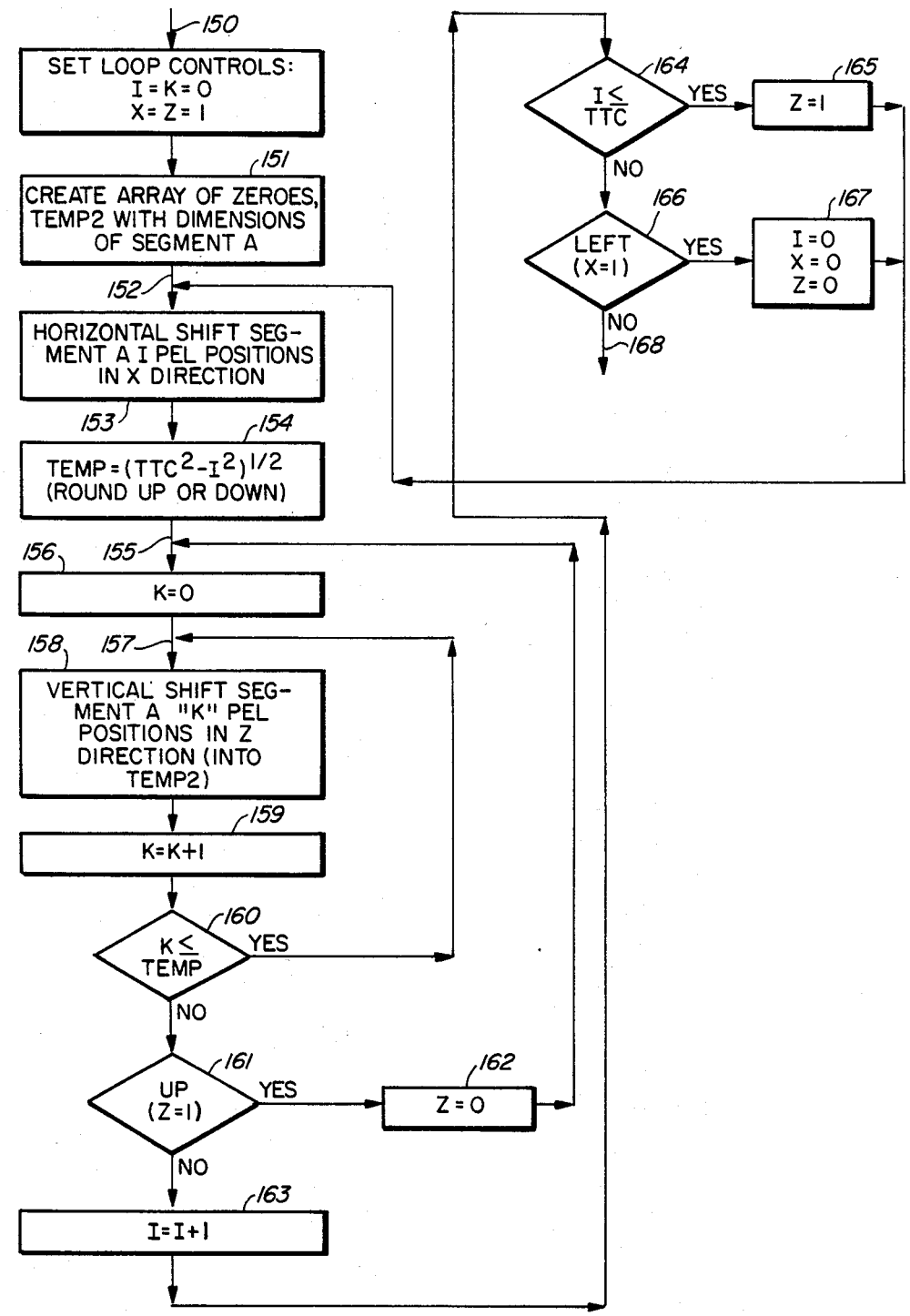
FIG. 10 is a flowchart illustrating some of the machine-implemented steps of the FIG. 9 illustrated machine operations.

FIG. 10 shows the APL flowchart for implementing the control 136 for creating the occlusion array from the superior graphic pattern for the desired contoured separation space TTC. The control is entered at 150 from other controls which are represented in the drawings and description as being data transfer and array selection (addressing) procedures, which are known machine operations and hence not detailed. The superior graphic expansion steps started at 150 include setting up control signals for subsequent iterative loops at 152, 155, 157. The parameter Z controls the vertical aspects of creating occlusion pels. Z=1 indicates occlusion pels are being added above the horizontal ordinate while Z=0 indicates occlusion pels are being added below the horizontal ordinate. The parameter X controls the lateral or horizontal aspects of creating occlusion pels. The parameter X=1 indicates that the left-hand semicircle of circle 51 is to be processed; X=0 indicates the right-hand semicircle is to be processed. In an internal computer register (not shown) designated as L7, the parameter I is set to zero. I is the count control for indicator for left- and right-hand lateral movements as will become apparent; shown in the FIG. 3 is the horizontal expansion of a single pel 50. Internal register L9 (not shown) has the parameter K equal to zero. K is the count control for vertical aspects as indicated by the arrows 52, 53, and 54 of FIG. 3. Numerals 152, 155, 157 designate the return points for all loops in the pel expansion or occlusion pattern generation process. It should be realized that the FIG. 10 illustration results in processing the entire superior graphic array of segment A. Refer momentarily to FIG. 3; when arrow 52 shows adding a single occlusion pel for superior graphic pel 50, in the constructed implementation all pels within the superior graphic will have an occlusion pel added in the same relative position in the expanded superior graphic or occlusion array. At 151, an array (TEMP2) of zeroes or background pel indicating signals is created that has the dimensions of segment A. TEMP2 accumulates at step 158 the occlusion pels created by the above-described expansion of segment A foreground pels. At 158, an occlusion pel is added to each pel of the segment A of the superior graphic corresponding to the first pel position above superior graphic pel 50 of FIG. 3. The value of K is incremented by one at step 159. Then, at step 160, the value of K is compared with a value TEMP created at step 154, i.e., have the number of occlusion pels been added vertically above the superior graphic pel 50 equal to the desired contoured space. If not, then the described process repeats at the next vertical pel position, i.e, two pels above superior graphic pel 50, for example. At step 158, additional occlusion pels are added and the loop repeated until at step 160 the value K exceeds the value TEMP. At this point the upwardly moving arrow 52 of FIG. 3 has been completed for all of the graphic pels (binary ones) of the segment A. Please note that background pels result in no occlusion pels being added.

From the loop consisting of steps 157-160, the APL superpose module 35 proceeds to step 161 which determines whether or not processing has been completed for the downward arrow 52, i.e., is the parameter Z equal to zero; if not, only the occlusion pels above the foreground pel 50 have been added. Accordingly, at step 162 the parameter Z is set to zero and junction point 155 returned to for repeating steps 157-160 for generating the occlusion pels below superior graphic foreground pel 50. Then step 161 is again re-executed but now Z is equal to zero, indicating that all of the occlusion pels represented by arrow 52 have been added to the segment A. At step 153, the pel positions lying on the pel 50 ordinate are determined by the values of I and X. The value I is incremented by one at step 163. Then at step 164, the value I is compared with TTC. Since I had been preset to zero for identifying the vertical ordinate intersecting the superior graphic pel 50, it is certainly not greater than TTC. Accordingly, at step 166, the current ordinate position is moved to the left by one pel position and a new value TEMP is calculated for the new ordinate position as in step 154; steps 155-162 are repeated for generating the occlusion pels represented by the left-most arrow 53 of FIG. 3. This procedure is repeated until the horizontal parameter I exceeds the desired contoured spacing TTC at step 164, at which time at step 166, APL module 35 checks the hemispheric parameter X for unity (as set at 150). If X is unity, then only the left hemisphere of the circle 51 has received occlusion pels. Then at step 167, at half-loop calibration step sets I=0, Z=1, and X=0. The above-described steps beginning at step 152 are repeated for the right-hand hemisphere of circle 31. Next time, machine step 166 is executed, X=0 indicating that all of the occlusion pels have been added for the superior graphic pels within the respective circle 51, indicating that the expanded superior graphics array for masking or occluding the inferior graphic pattern has been completed within. Remember the FIG. 10 illustrated steps occur for all segment A foreground pels as known for APL array processing. Accordingly, at 168, the APL module 35 execution proceeds to step 107 for deleting the extra areas, and to step 107A for NOT ANDing the mask with the inferior graphic pattern.

While all of the graphic patterns illustrated in the drawings have been at relatively coarse resolutions for the patterns used to illustrate contouring a separation space between a set of graphic patterns being superposed, it should be understood that, at high resolution graphics (240 pels per inch and greater), the practical effect of first expanding the inferior graphic pattern for segmenting the superior graphic pattern, then expanding the segmented (or complete) superior graphic pattern for generating a mask or occlusion array followed by NOT ANDing the occlusion array with the inferior graphic pattern, and then recombining the fragmented array, (resulting from the NOT ANDing the inferior graphic with the original superior graphic) results in a set of superposed graphics separated by a contoured space to the superior graphic having a typographic quality contoured spacing selected by the user. The advantage of the selective spacing is that the spacing can be selected in accordance with the type of graphics being superposed. For example, with character graphics there are fonts that have relatively heavyweight characters and fonts that have relatively lightweight characters. The terms "heavyweight" and "lightweight" refer to the width of the strokes or lines constituting the characters. For a heavy character, a greater spacing is desired while for a lightweight character, the spacing can be substantially less for obtaining typographic aesthetics. It should also be borne in mind that many fonts have character graphics with serifs and other ornate graphic configurations which the above-described processing accommodates for ensuring a contouring of the fragmented or intercepted inferior graphic to the superior graphic, including having pels of the inferior graphic in the interior background portions of the superior graphic. Such contouring not only automatically follows the general contour of the superior graphics, but also matches the fineness of the design of the superior graphics, all without human intervention or observation.

While the invention has been particularly shown and described with reference to preferred embodiments thereof, it will be understood by those skilled in the art that various changes in form and details may be made therein without departing from the spirit and scope of the invention.

What is claimed is:

1. The machine-implemented method of superposing a recessive graphic-generating pattern on a dominant graphic-generating pattern, representing each of said graphics as an array of foreground digital signals arranged to correspond to a dot raster pattern configured as the respective graphic patterns;

including the machine-executing steps of:

electrically indicating a graphics separation dimension as an integral number of said dots;

generating an array of digital signals from said dominant graphic array by adding said integral number of said digital signal positions, the dominant graphic array at each dot position of the periphery thereof creating an occlusion array such that said occlusion array appears as an enlarged dominant graphic pattern array;

logically NOT-ANDING said recessive graphic array of foreground digital signals into said occlusion array of foreground digital signals for producing a fragmented array from said recessive graphic array, such that the fragment array only has foreground digital signals not coinciding with occlusion array foreground digital signals; and logically ORing said dominant array with said fragmented array for producing a superposed graphic-generating pattern as an array of digital signals suitable for a raster pattern graphics presentation device to present a superposed graphic.

2. The machine-implemented method as set forth in claim 1 further including the machine-executing steps of:

measuring the size of said recessive graphic-generating pattern and digitally indicating predetermined areal dimensions in accordance with said measuring;

selecting a portion of said dominant graphic-generating pattern having an area in accordance with said areal dimension indications; and performing the steps set forth in claim 1 on said selected portion and said recessive graphic-generating pattern and then merging said logic-OR produced graphic pattern into said dominant graphic-generating pattern.

3. The machine-implemented method of superposing one graphic pattern on another graphic pattern wherein each of the graphic patterns consists of first and second rectangular arrays of dots generated from raster patterns of first binary signals on a clear background represented in the arrays by second binary signals;

said method being practiced in a programmable digital machine which provides an output representing the superposed graphic as an array of said first and second binary signals usable to visually present the superposed graphic by document presentation devices employing such raster patterns;

characterized in that:

the method includes the steps of aligning the two patterns, expanding the first pattern by a number of dots equal to a desired separation of the first and second patterns as combined into a superposed pattern being created, in the expansion adding first binary signals to the first pattern in a radius about each first binary signal substantially equal to the desired separation, masking said expanded pattern into the second pattern for creating a fragmented pattern having said first binary signals only in the background area of the expanded pattern and combining said first and fragmented patterns to create a superposed graphic-generating pattern.

4. The machine-implemented method set forth in claim 3 further including the machine-executing steps of:

measuring the area of said first pattern and selecting only a portion of said second pattern having a predetermined areal relationship to said measured area for processing in accordance with the claim 3 recited steps; and, upon completion of said processing, merging said superposed graphic pattern array into the first pattern in a logic-OR manner for said first binary signals in said first and second patterns.

5. The method for expanding while maintaining typographic quality of a graphic-generating pattern array using a digital computer wherein the pattern array is represented as a rectangular array of pattern digital signals and background digital signals, said pattern array consisting of a plurality of signal positions, each signal position being capable of storing either a pattern or a background signal;

characterized in that the method includes the automatic steps of:

selecting an expansion value defined in signal positions of the pattern array; and for each pattern digital signal adjacent a background digital signal in the pattern array, defining a circle equal to the expansion value and within said circle for each of said adjacent pattern digital signals changing any background digital signals to pattern digital signals.

6. The method set forth in claim 5 further including the step of:

before changing said background digital signals to said pattern, digital signals, adding background digital signals to the pattern array for expanding the pattern array in each of four directions of the rectangular array by a number of signal positions equal to said expansion value.

7. A graphic pattern generator comprising a programmed digital computer having allocatable digital signal storage and a library storage of graphic-generating patterns stored as rectangular arrays of first binary signals indicating foreground pels and second binary signals indicating background pels, means coupled to said digital computer for transferring said arrays;

between said library storage and said signal storage, said digital signal arrays being capable of enabling a graphics presentation device to generate graphics having configurations in accordance with said first binary signals;

the improvement, including in combination:

first program indicia in said signal storage for enabling said digital computer to select first and second generating patterns respectively as dominant and recessive patterns and for transferring such selected patterns from said library storage to said signal storage;

second program indicia in said signal storage for enabling said digital computer to generate an occlusion array of said first binary signals by adding a circular array having a predetermined radius of said first binary signals around each and every one of said first binary signals in said first generating pattern;

third program indicia in said signal storage for enabling said digital computer to mask said occlusion array of first digital signals into said second generating pattern for deleting all first digital signals from said second pattern that coincide with first digital signals in said occlusion array for generating a fragmented array; and fourth program indicia in said signal storage for enabling said digital computer to merge said fragmented array into said first generating pattern for creating a superposed graphic-generating pattern from said first and second generating patterns and having a separation between the first generating pattern and said fragmented pattern equal to said predetermined radius, and for storing said superposed graphic-generating pattern in said library storage.

* * * * *